United States Patent
Otani et al.

(10) Patent No.: US 7,414,654 B2
(45) Date of Patent: Aug. 19, 2008

(54) ANALOG CIRCUIT FOR PROCESSING OUTPUT SIGNAL OF IMAGE SENSOR AND IMAGING APPARATUS USING THE SAME

(75) Inventors: Mitsuhiko Otani, Amagasaki (JP);
Shinichi Ogita, Yawata (JP); Yoshitsugu Inagaki, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 721 days.

(21) Appl. No.: 10/828,000

(22) Filed: Apr. 19, 2004

(65) Prior Publication Data

US 2006/0152608 A1    Jul. 13, 2006

(30) Foreign Application Priority Data

Apr. 22, 2003  (JP) .............................. 2003-116865

(51) Int. Cl.
*H04N 3/14* (2006.01)
*H04N 5/335* (2006.01)

(52) U.S. Cl. ...................................................... 348/312
(58) Field of Classification Search ................. 348/294, 348/302, 308, 311, 312; 327/102
See application file for complete search history.

(56) References Cited

U.S. PATENT DOCUMENTS

| | | | | |
|---|---|---|---|---|
| 4,794,459 A * | 12/1988 | Moberg et al. | ............... | 348/346 |
| 5,043,719 A * | 8/1991 | Nakagawa et al. | ........... | 348/294 |
| 5,648,818 A * | 7/1997 | Fukatsu | ...................... | 348/273 |
| 6,163,342 A * | 12/2000 | Suzuki | ........................ | 348/296 |
| 6,185,274 B1 * | 2/2001 | Kinno et al. | ............... | 378/98.8 |
| 6,441,684 B1 | 8/2002 | Nakamura | | |
| 6,801,254 B1 * | 10/2004 | Nishio | ........................ | 348/241 |
| 6,809,770 B1 * | 10/2004 | Ide | .............................. | 348/311 |
| 6,940,553 B1 * | 9/2005 | Katoh | ......................... | 348/311 |
| 2002/0100921 A1 * | 8/2002 | Mabuchi et al. | ............. | 257/222 |

(Continued)

FOREIGN PATENT DOCUMENTS

JP    7-302500    11/1995

(Continued)

*Primary Examiner*—Lin Ye
*Assistant Examiner*—Jason Whipkey
(74) *Attorney, Agent, or Firm*—Hamre, Schumann, Mueller & Larson, P.C.

(57) ABSTRACT

An analog circuit includes a pulse control circuit for outputting pulse signals for operating component circuits based on reference pulse signals for driving an image sensor, a noise reduction circuit that is operated in accordance with a pulse signal of a horizontal drive frequency output from the pulse control circuit to reduce noise present in image signals output from the image sensor, a gain variable amplifier for adjusting an amplitude of signals output by the noise reduction circuit, an AD converter for converting the output signals of the gain variable amplifier into digital signals and output these digital signals, a clamp circuit that is operated in accordance with a pulse signal at a horizontal drive frequency output from the pulse control circuit to perform feedback control of the digital signals output by the AD converter, and a frequency-dependent bias circuit that supplies a current amount corresponding to the frequency of at least one kind of pulse signal from among the reference pulse signals and the pulse signals that are output from the pulse control circuit. The analog circuit is operated at a sufficient current amount required for the processing of signals from various image sensors having different horizontal drive frequency specifications.

6 Claims, 5 Drawing Sheets

U.S. PATENT DOCUMENTS

| | | |
|---|---|---|
| 2002/0179821 A1 | 12/2002 | Aibara et al. |
| 2003/0090577 A1* | 5/2003 | Shirakawa ............... 348/222.1 |
| 2003/0133007 A1* | 7/2003 | Iijima et al. ................... 348/46 |
| 2003/0223004 A1* | 12/2003 | Kubota et al. ............... 348/294 |

FOREIGN PATENT DOCUMENTS

| | | |
|---|---|---|
| JP | 2000-270267 | 9/2000 |
| JP | 2001-36358 | 2/2001 |

* cited by examiner

ANALOG CIRCUIT FOR PROCESSING OUTPUT SIGNAL OF IMAGE SENSOR AND IMAGING APPARATUS USING THE SAME

BACKGROUND OF THE INVENTION

1. Field of the Invention

The present invention relates to circuits for analog processing the signals output from image sensors such as CCD (Charge Coupled Device) area sensors and CMOS sensors, and imaging apparatuses provided with the same.

2. Description of the Related Art

FIG. 8 shows an example of a conventional analog circuit 10 for analog processing the output signals of an image sensor (see for example JP 2000-270267A and JP 2001-36358A). The analog circuit 10 is made of a noise reduction circuit 3 that receives signals output by a CCD 2, a gain variable amplifier 4 that receives signals output by the noise reduction circuit 3, an AD converter 5 that receives signals output by the gain variable amplifier 4 and converts them into digital signals that it outputs, a clamp circuit 6 for performing feedback control with respect to the digital signals output from the AD converter 5, a pulse control circuit 7 that supplies pulses for operating these component circuits, and a bias circuit 9 for supplying current to the noise reduction circuit 3, the gain variable amplifier 4, and the AD converter 5.

Four pulses are input to the pulse control circuit 7, namely a signal sampling pulse A for sampling the video period in the signals for each pixel at the horizontal drive frequency of the CCD, a reference sampling pulse B for sampling the reference voltage period in the signals for each pixel at the horizontal drive frequency, an AD converter pulse C for conversion to digital for each pixel at the horizontal drive frequency, and a clamp pulse D for fixing the DC voltage of the signals at the horizontal drive frequency. The pulse control circuit 7 creates and outputs various pulses for operating the other component circuits based on these pulses.

The noise reduction circuit 3 is operated in accordance with a pulse at the horizontal drive frequency that is output from the pulse control circuit 7 and reduces the noise in the output signals from the CCD 2. The gain variable amplifier 4 is operated in accordance with a pulse at the horizontal drive frequency that is output from the pulse control circuit 7 and adjusts the amplitude of the output signals of the noise reduction circuit 3 by altering the gain. The AD converter 5 is operated in accordance with a pulse at the horizontal drive frequency that is output from the pulse control circuit 7 and converts the output signals of the gain variable amplifier 4 into digital signals that it outputs. The clamp circuit 6 is operated in accordance with a pulse at the horizontal drive frequency that is output from the pulse control circuit 7 and performs feedback control such that the signal data of the reference period in the digital signals output from the AD converter 5 are identical to data that have been set freely.

The horizontal drive frequency, which is the repeat frequency of the signals output from the CCD 2, spans a wide range from several MHz to several 10 MHz due to the specifications for the number of pixels and the number of frames per second serving as video signals. The noise reduction circuit 3, the gain variable amplifier 4, and the AD converter 5 require a large amount of current if the horizontal drive frequency, which is the repeat frequency of the signals output from the CCD 2, is high, but are capable of operating adequately at less current if the horizontal drive frequency is low.

On the other hand, the output bias current, which is the current supplied to the noise reduction circuit 3, the gain variable amplifier 4, and the AD converter 5 from the bias circuit 9 of the conventional analog circuit 10 shown in FIG. 8, stays constant regardless of the frequency of the signals output from the CCD 2 that are to be processed. It is thus necessary that the current amount is set such that it is possible to process the output signals of a CCD 2 with the highest horizontal drive frequency specification that can be adopted. Consequently, a current amount that is greater than necessary is used if a CCD 2 with a lower horizontal drive frequency specification whose output signals can be processed with a smaller current amount is employed as is. Alternatively, it becomes necessary to redesign for a separate bias circuit that supplies a smaller current amount that is sufficient for this operation.

However, sending more current than is necessary shortens the charge life of the battery in battery-driven portable devices. Also, redesigning for a separate bias circuit results in an increase in the design time that is required to match the specifications of the CCD camera, for example.

SUMMARY OF THE INVENTION

It is an object of the present invention to provide an analog circuit that, using a common circuit, operates at a sufficient current amount required for the signal processing of signals output by various image sensors having different horizontal drive frequency specifications.

An analog circuit of the present invention is provided with a pulse control circuit for outputting pulse signals for operating component circuits based on reference pulse signals for driving an image sensor, a noise reduction circuit that is operated in accordance with a pulse signal of a horizontal drive frequency that is output from the pulse control circuit and reduces noise present in an image signal output from the image sensor, a gain variable amplifier that is operated in accordance with a pulse signal at a horizontal drive frequency that is output from the pulse control circuit and adjusts an amplitude of a signal output by the noise reduction circuit by altering the gain, an AD converter that is operated in accordance with a pulse signal of a horizontal drive frequency that is output from the pulse control circuit and converts a signal output by the gain variable amplifier into a digital signal and outputs the digital signal, a clamp circuit that is operated in accordance with a pulse signal of a horizontal drive frequency that is output from the pulse control circuit and performs feedback control such that signal data of a reference period in a digital signal output by the AD converter is identical to predetermined data, and a bias circuit for supplying current to at least one of the noise reduction circuit, the gain variable amplifier, and the AD converter.

The bias circuit is constituted by a frequency-dependent bias circuit that receives at least one kind of pulse signal from among the reference pulse signals that are input to the pulse control circuit and the pulse signals of the horizontal drive frequency that are output from the pulse control circuit, and supplies a current amount that corresponds to the frequency of the received pulse signal to at least one of the noise reduction circuit, the gain variable amplifier, and the AD converter.

An imaging apparatus of the present invention is provided with an image sensor that is driven based on a predetermined reference pulse signal and outputs image signals, and the above analog circuit to which these image signals are input.

DESCRIPTION OF THE PREFERRED EMBODIMENTS

Analog circuits for processing signals output by an image sensor and imaging apparatuses of the present invention have a frequency-dependent bias circuit in place of a conventional bias circuit. The frequency-dependent bias circuit receives at least one kind of pulse signal from among the reference pulse signal input to the pulse control circuit and the pulse signals of the horizontal drive frequency that are output from the pulse control circuit, and supplies a current amount that corresponds to the frequency of the received pulse signal to at least one of the noise reduction circuit, the gain variable amplifier, and the AD converter.

Consequently, the amount of current that is supplied to the noise reduction circuit, the gain variable amplifier, or the AD converter is large when the horizontal drive frequency, that is, the repeat frequency of the signals output from the image sensor that are to be processed, is high, and is small when this frequency is low, so that a current amount that is within a satisfactory range required for operating the various circuits is supplied.

In the analog circuit and the imaging apparatus of the present invention, it is also possible to adopt a configuration in which the reference pulse signals input to the pulse control circuit include a reference sampling pulse for sampling a reference voltage period in a signal for each pixel at the horizontal drive frequency of the image sensor, a signal sampling pulse for sampling a video period in the signal for each pixel at the horizontal drive frequency, an AD converter sampling pulse for conversion to digital signals for each pixel at the horizontal drive frequency, and a clamp pulse for performing DC voltage clamping of the signal at the horizontal drive frequency, wherein the reference pulse signal that is input to the frequency-dependent bias circuit is selected from among the signal sampling pulse, the reference sampling pulse, and the AD converter sampling pulse.

It is also possible to adopt a configuration in which the frequency-dependent bias circuit is provided with switched capacitor circuits in which analog switches and capacitors are combined, and the analog switches are switched on and off by the pulse signals that are input to repeatedly charge and discharge the capacitor and supply current in conjunction with this charging and discharging.

Figure 1:
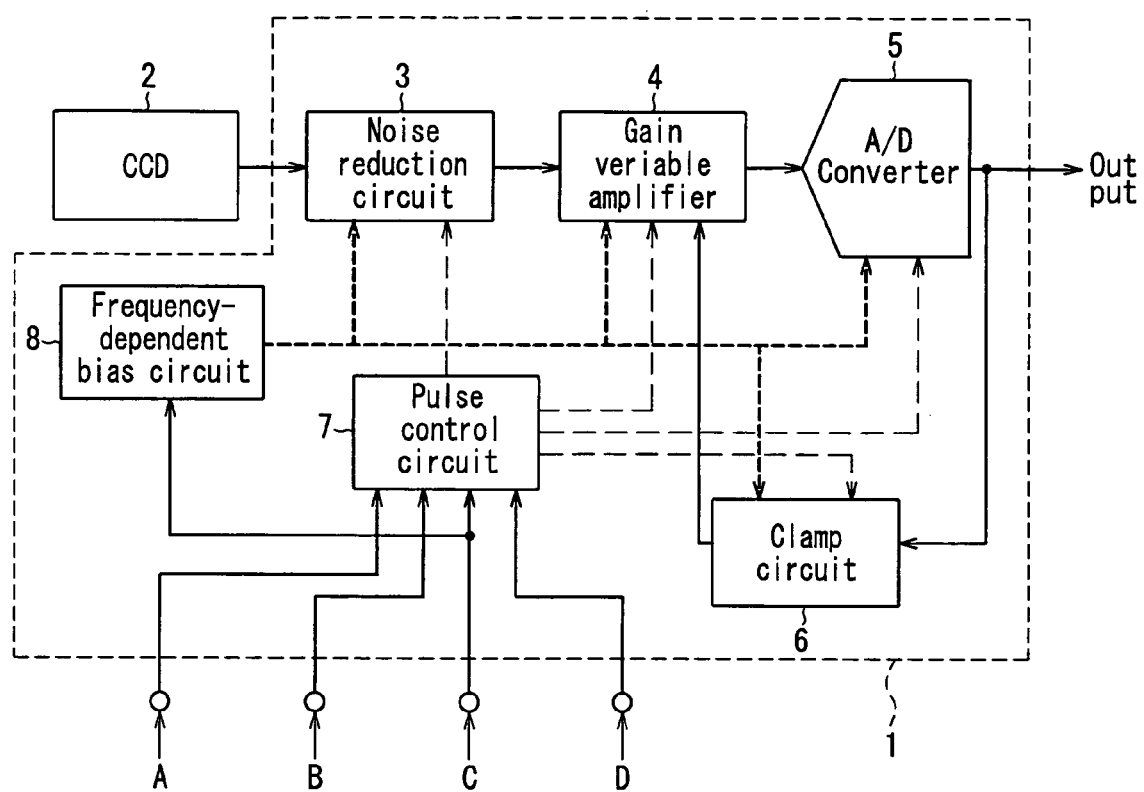
FIG. 1 is a block diagram showing an analog circuit for processing the output signals of a CCD according to a first embodiment of the present invention.
Figure 8:
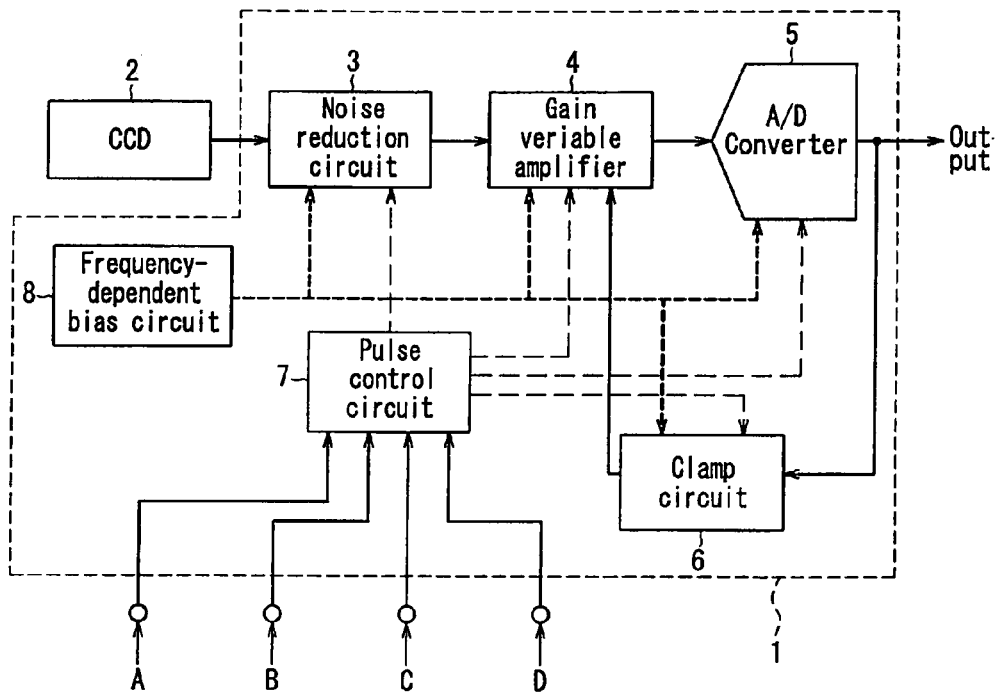
FIG. 8 is a block diagram showing a conventional analog circuit for processing the output signals of a CCD.

An analog circuit for processing output signals of image sensors according to a first embodiment is described below with reference to the drawings. FIG. 1 is a block diagram showing an analog circuit 1. Except for a frequency-dependent bias circuit 8, the circuits making up the analog circuit 1 are identical to those of the analog circuit 10 shown in FIG. 8. Thus, identical circuit elements are assigned identical reference numerals and a repetition of the description thereof is omitted.

The frequency-dependent bias circuit 8 receives the AD converter pulse C and supplies a current of an amount that corresponds to the frequency of this pulse to the noise reduction circuit 3, the gain variable amplifier 4, and the AD converter 5. A sufficient current amount that must be supplied to the noise reduction circuit 3, the gain variable amplifier 4, and the AD converter 5 of the analog circuit 1 is expressed as a function of the horizontal drive frequency of the CCD 2, whose signals are to be processed. Consequently, in the above configuration, the frequency-dependent bias circuit 8 is designed such that it outputs an output bias current according to a function of the frequency using the AD converter pulse C, based on the fact that the AD converter pulse C that is input has the same horizontal drive frequency as the output signals of the CCD 2. Thus, using the common circuit, it is possible to avoid supplying a current in excess of the necessary current to the circuits when processing the signals of CCDs whose horizontal drive frequencies span a wide range.

Figure 2:
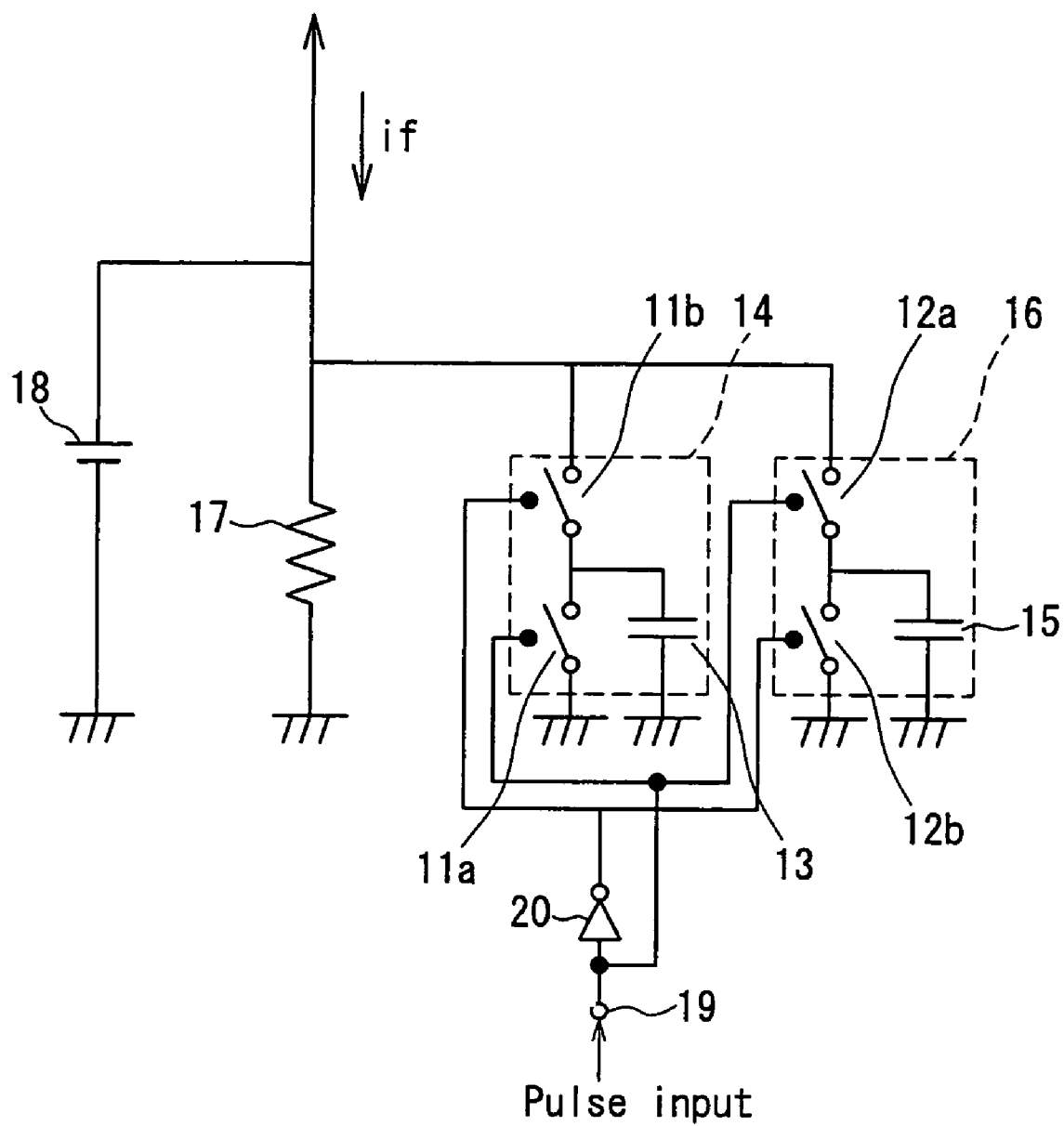
FIG. 2 is a circuit diagram showing the frequency-dependent bias circuit employed by this analog circuit.

FIG. 2 shows a specific example of the configuration of the frequency-dependent bias circuit 8. This circuit has two pairs of analog switches connected in series, that is, analog switches 11a and 11b connected in series and analog switches 12a and 12b connected in series. A switched capacitor 14 is constituted by the analog switches 11a and 11b and a capacitor 13 inserted between a node between the analog switches 11a and 11b and the ground potential. Similarly, a switched capacitor 16 is constituted by the analog switches 12a and 12b and a capacitor 15 inserted between a node between the analog switches 12a and 12b and the ground potential. The two switched capacitors 14 and 16 and a resistance 17 are connected in parallel between the ground potential and a reference potential 18.

A pulse having the horizontal drive frequency, which is the repeat cycle for each pixel of the CCD, is input from a pulse input terminal 19. This input pulse is supplied to one analog switch as is and supplied to the other analog switch inverted by an inverter 20. The analog switch 11a (12b) on the ground side that is part of the one switched capacitor 14 (16) and the analog switch 12a (11b) on the reference potential 18 side that is part of the other switched capacitor 16 (14) are connected such that they are turned on and off by the same pulse. That is, the input pulse is supplied as is to the analog switches 11a and 12a and is supplied to the analog switches 11b and 12b after first being inverted by the inverter 20. Consequently, the analog switches 11a and 12a, and 11b and 12b, are turned on and off by pulses whose phases differ from one another by 180 degrees.

According to this configuration, the pairs of capacitors 13 and 15, making up the switched capacitors 14 and 16 are repeatedly charged and discharged in a complementary manner by pulses whose phases are shifted by 180 degrees, and thus when C is the value of the capacitors 13 and 15 of the frequency-dependent bias circuit, R is the value of the resistance 17, Vr is the value of the reference potential 18, and fccd is the horizontal drive frequency of the CCD, the output bias current if is expressed by the following formula.

$$if = Vr/R + Vr \cdot fccd \cdot C$$

Here, by using a reference potential Vr, a resistance R, and a capacitor C found by primary regression from the current value that is required for the horizontal drive frequency fccd of each CCD, with a same circuit constant it is possible to supply a current amount in a sufficient current range that is required for operating the constituent circuits that corresponds to a wide range of horizontal drive frequency specifications.

FIG. 3 to FIG. 7 shows various other embodiments in which a portion of the analog circuit embodied as shown in FIG. 1 has been modified. As shown below, a feature of the configurations of these drawings is that different pulses are input to the frequency-dependent bias circuit 8.

Figure 3:
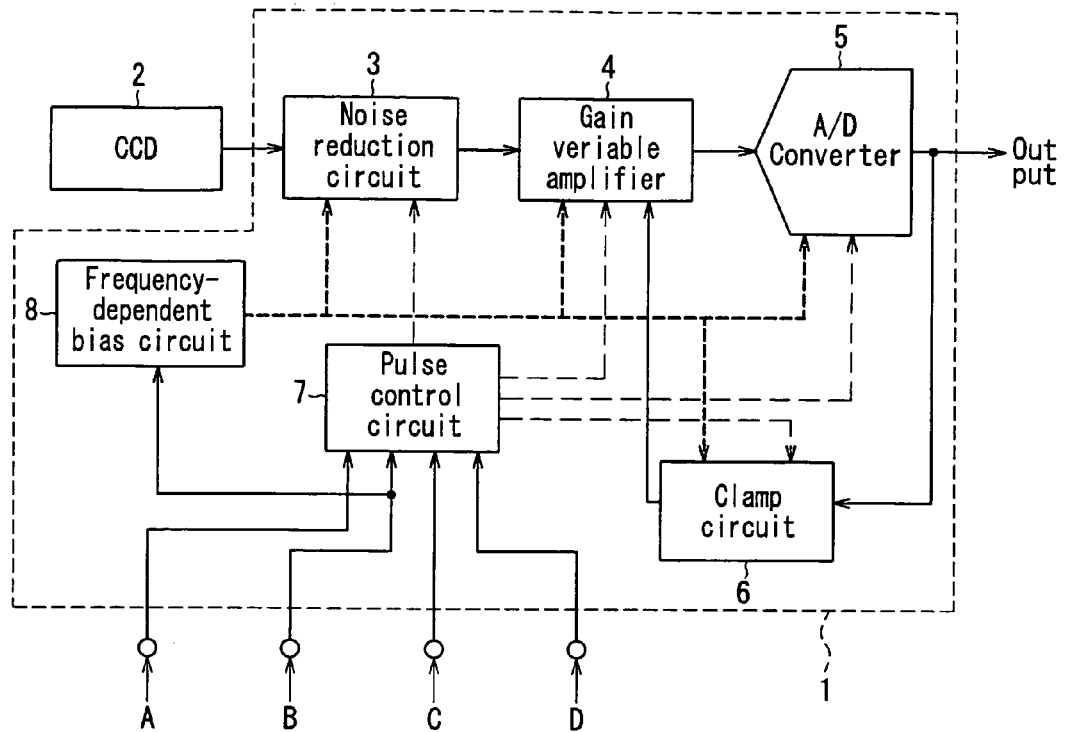
FIG. 3 is a block diagram showing an analog circuit according to another embodiment.
Figure 4:
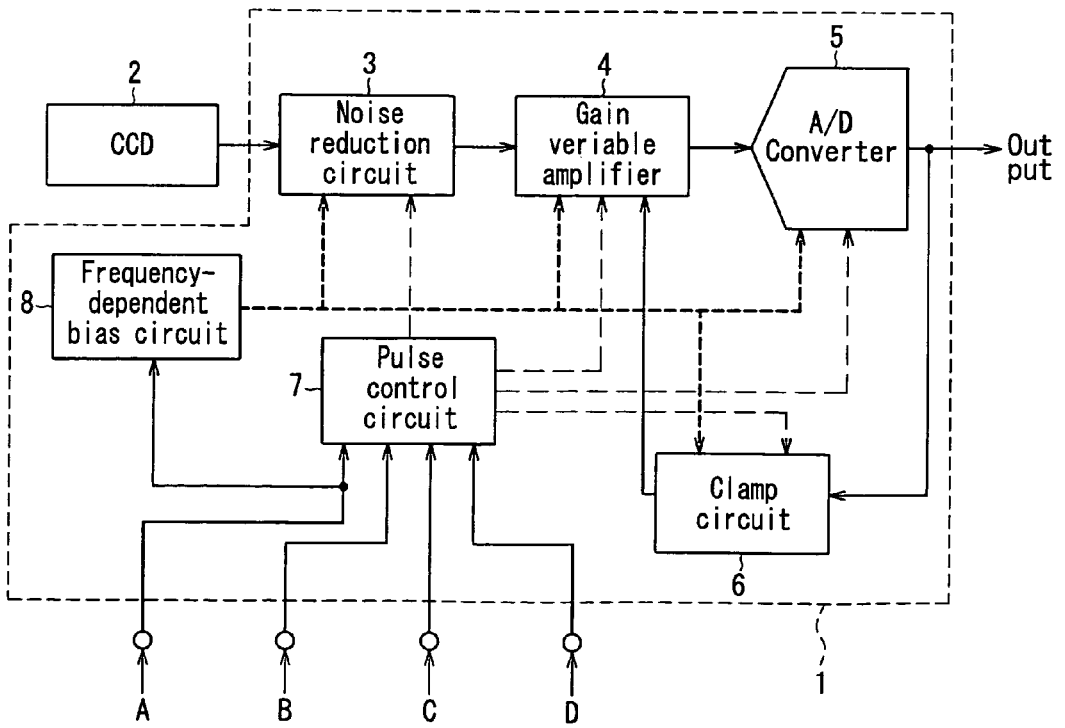
FIG. 4 is a block diagram showing an analog circuit according to yet another embodiment.
Figure 5:
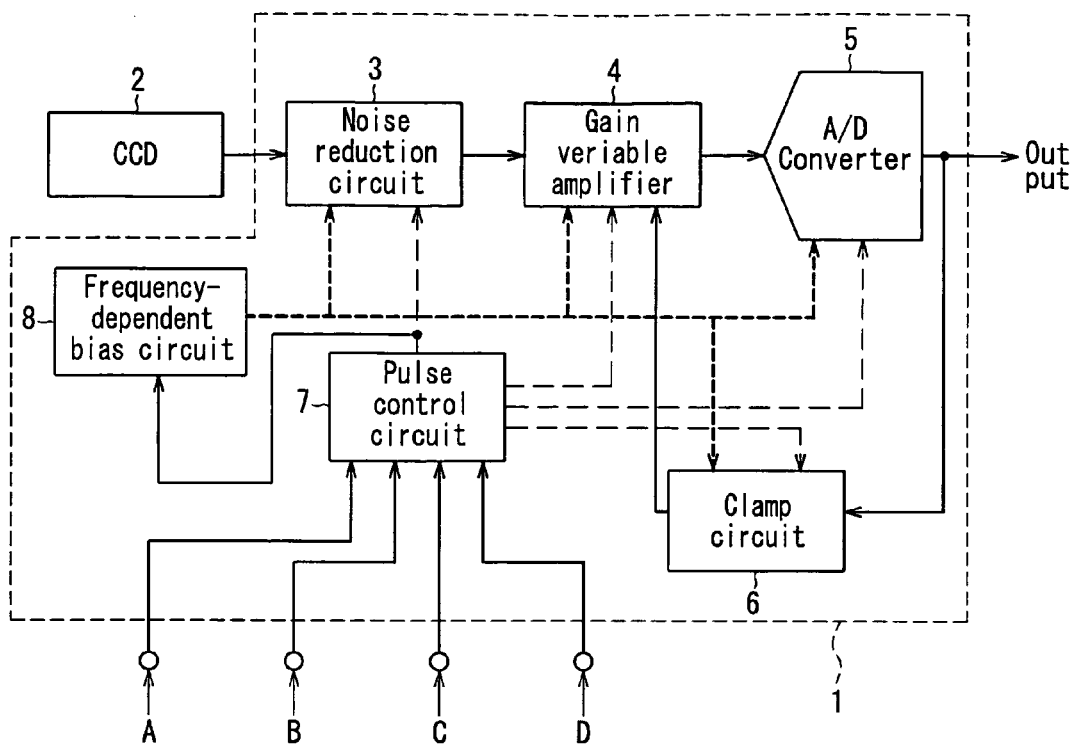
FIG. 5 is a block diagram showing an analog circuit according to yet another embodiment.
Figure 6:
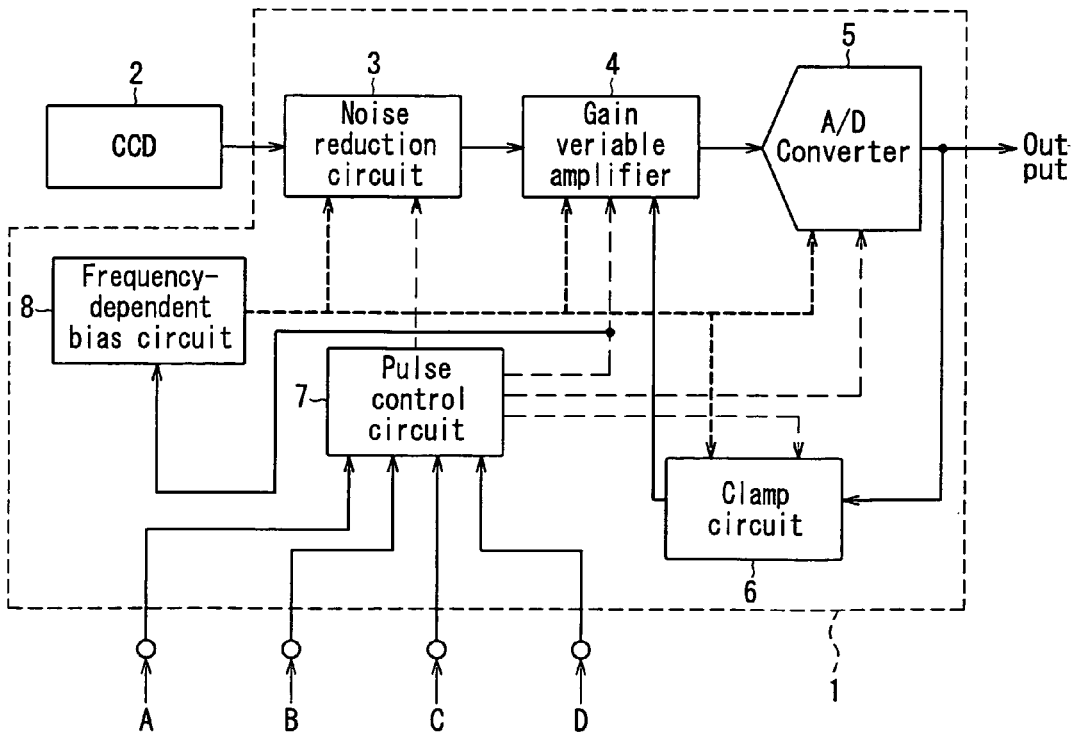
FIG. 6 is a block diagram showing an analog circuit according to yet another embodiment.
Figure 7:
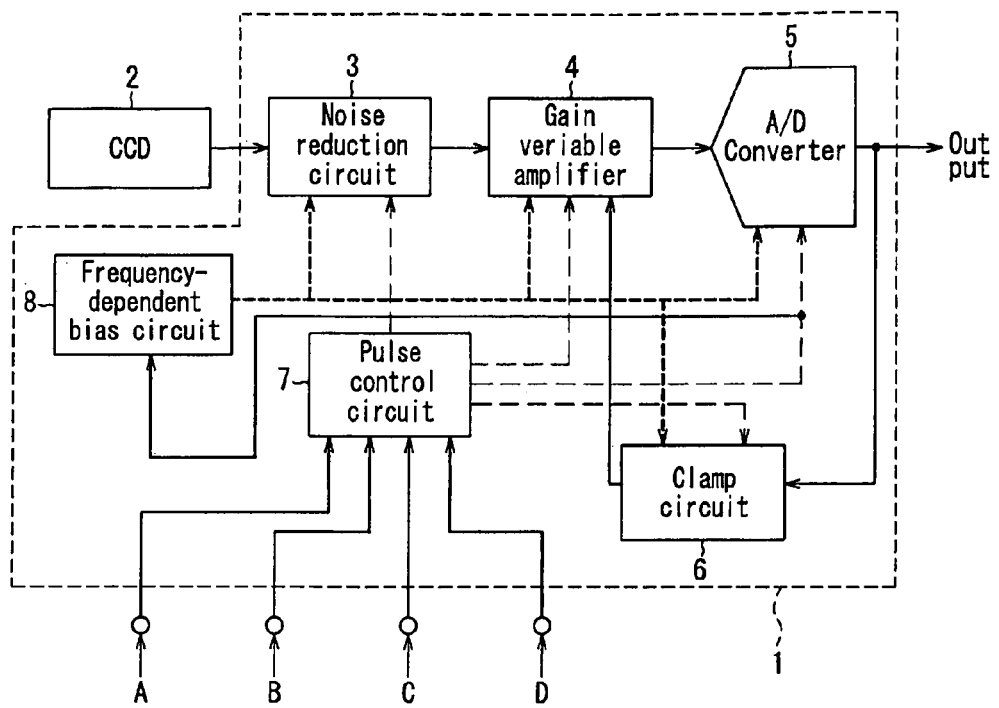
FIG. 7 is a block diagram showing an analog circuit according to yet another embodiment.

In the configuration of FIG. 3, the reference sampling pulse B that is input to the pulse control circuit 7 is used. In the configuration of FIG. 4, the signal sampling pulse A that is input to the pulse control circuit 7 is used. In the configuration of FIG. 5, the pulse that is input to the noise reduction circuit 3 from the pulse control circuit 7 is used. In the configuration of FIG. 6, the pulse that is input to the gain variable amplifier 4 from the pulse control circuit 7 is used. And in the configuration of FIG. 7, the pulse that is input to the AD converter 5 from the pulse control circuit 7 is used.

All the pulses that are input to the frequency-dependent bias circuit 8 have the same horizontal drive frequency as the output signals of the CCD 2. Consequently, the frequency-dependent bias circuit 8 can be designed such that it uses these pulses to output an output bias current that is in accordance with a function of the horizontal drive frequency of the CCD 2 whose signals are to be processed. Thus, in the same manner as in the implementation of FIG. 1, using the common circuit it is possible to avoid supplying a current in excess of the necessary current to the circuits when processing the signals of CCDs driven within a wide range of horizontal drive frequencies.

Thus, the analog circuits according to embodiments of the present invention are capable of processing the signals of CCDs of various horizontal drive frequencies with a sufficient current amount required for the operation using the common circuit, allowing them easily to be adopted for different specifications. Also, shortening of the charge life of the battery is avoided because the wasteful supply of an excessive current is eliminated.

Furthermore, adopting switched capacitors that combine analog switches and capacitors as the frequency-dependent bias circuit of the analog circuit makes mounting to a semiconductor integrated circuit easy, and thus the analog circuit is suited for industrial mass production.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An analog circuit for image sensor output signal processing, comprising:
    a pulse control circuit for outputting pulse signals for operating component circuits based on reference pulse signals corresponding to driving of the image sensor; and
    a bias circuit for supplying current to at least one portion of a component circuit;
    wherein the bias circuit is constituted by a frequency-dependent bias circuit that receives at least one kind of pulse signal from among the reference pulse signals that are input to the pulse control circuit and the pulse signals corresponding to driving of the image sensor that are output from the pulse control circuit, and supplies a current amount that corresponds to the frequency of the received pulse signal to at least one portion of the component circuit,
    a reference sampling pulse for sampling a reference voltage period in a signal for each pixel at the horizontal drive frequency of the image sensor, a signal sampling pulse for sampling a video period in the signal for each pixel at the horizontal drive frequency, an AD converter sampling pulse for conversion to digital signals for each pixel at the horizontal drive frequency, and a clamp pulse for performing DC voltaae clamping of the signal at the horizontal drive frequency, are input to the pulse control circuit as the reference pulse signals; and
    the reference pulse signal that is input to the frequency-dependent bias circuit is selected from among the signal sampling pulse, the reference sampling pulse, and the AD converter sampling pulse.

2. The analog circuit according to claim 1,
    wherein the frequency-dependent bias circuit is provided with switched capacitor circuits in which analog switches and capacitors are combined, and the analog switches are switched on and off by the pulse signals that are input to repeatedly charge and discharge the capacitor and supply current in conjunction with this charging and discharging.

3. An imaging apparatus comprising:
    an image sensor that is driven based on a predetermined reference pulse signal and outputs image signals;
    a pulse control circuit for outputting pulse signals for operating component circuit based on reference pulse signals corresponding to the predetermined reference pulse signal; and
    a bias circuit for supplying current to at least one portion of a component circuit;
    wherein the bias circuit is constituted by a frequency-dependent bias circuit that receives at least one kind of pulse signal from among the reference pulse signals that are input to the pulse control circuit and the pulse signals corresponding to driving of the image sensor that are output from the pulse control circuit, and supplies a current amount that corresponds to the frequency of the received pulse signal to at least one portion of the component circuit,
    a reference sampling pulse for sampling a reference voltage period in a signal for each pixel at the horizontal drive frequency of the image sensor, a signal sampling pulse for sampling a video period in the signal for each pixel at the horizontal drive frequency, an AD converter sampling pulse for conversion to digital signals for each pixel at the horizontal drive frequency, and a clamp pulse for performing DC voltage clamping of the signal at the horizontal drive frequency, are input to the pulse control circuit as the reference pulse signals; and
    the reference pulse signal that is input to the frequency-dependent bias circuit is selected from among the signal sampling pulse, the reference sampling pulse, and the AD converter sampling pulse.

4. The imaging apparatus according to claim 3,
    wherein the frequency-dependent bias circuit is provided with switched capacitor circuits in which analog switches and capacitors are combined, and the analog switches are switched on and off by the pulse signals that are input to repeatedly charge and discharge the capacitor and supply current in conjunction with this charging and discharging.

5. An analog circuit, for image sensor output signal processing, comprising:
    a pulse control circuit for outputting pulse signals for operating a component circuit based on reference pulse signals corresponding to driving of the image sensor; and a bias circuit for supplying current to at least one portion of a component circuit;

wherein the component circuit comprises:

a noise reduction circuit that is operated in accordance with a pulse signal of a horizontal drive frequency that is output from the pulse control circuit and reduces noise present in an image signal output from the image sensor;

a gain variable amplifier that is operated in accordance with a pulse signal at a horizontal drive frequency that is output from the pulse control circuit and adjusts an amplitude of a signal output by the noise reduction circuit by altering the gain;

an AD converter that is operated in accordance with a pulse signal of a horizontal drive frequency that is output from the pulse control circuit and converts a signal output by the gain variable amplifier into a digital signal and outputs the digital signal; and a clamp circuit that is operated in accordance with a pulse signal of a horizontal drive frequency that is output from the pulse control circuit and performs feedback control such that signal data of a reference period in a digital signal output by the AD converter is identical to predetermined data;

wherein the bias circuit supplies current to at least one of the noise reduction circuit, the gain variable amplifier, and the AD converter, an amount of the current corresponding to the frequency of the received pulse signal to at least one of the noise reduction circuit, the gain variable amplifier, and the AD converter, respectively, and wherein the bias circuit is constituted by a frequency-dependent bias circuit that receives at least one kind of pulse signal from among the reference pulse signals that are input to the pulse control circuit and the pulse signals corresponding to driving of the image sensor that are output from the pulse control circuit, and supplies a current amount that corresponds to the frequency of the received pulse signal to at least one portion of the component circuit.

6. An imaging apparatus comprinsing:

an image sensor that is driven based on a predetermined reference pulse signal and outputs image signals:

a pulse control circuit for outputting pulse signals for operating a component circuit based on reference pulse signals corresponding to the predetermined reference pulse signal; and a bias circuit for supplying current to at least one portion of a component circuit;

wherein the component circuit comprises:

a noise reduction circuit that is operated in accordance with a pulse signal of a horizontal drive frequency that is output from the pulse control circuit and reduces noise present in an image signal output from the image sensor;

a gain variable amplifier that is operated in accordance with a pulse signal at a horizontal drive frequency that is output from the pulse control circuit and adjusts an amplitude of a signal output by the noise reduction circuit by altering the gain;

an AD converter that is operated in accordance with a pulse signal of a horizontal drive frequency that is output from the pulse control circuit and converts a signal output by the gain variable amplifier into a digital signal and outputs the digital signal; and a clamp circuit that is operated in accordance with a pulse signal of a horizontal drive frequency that is output from the pulse control circuit and performs feedback control such that signal data of a reference period in a digital signal output by the AD converter is identical to predetermined data;

wherein the bias circuit supplies current to at least one of the noise reduction circuit, the gain variable amplifier, and the AD converter, an amount of the current corresponding to the frequency of the received pulse signal to at least one of the noise reduction circuit, the gain variable amplifier, and the AD converter, respectively, and wherein the bias circuit is constituted by a frequency-dependent bias circuit that receives at least one kind of pulse signal from among the reference pulse signals that are input to the pulse control circuit and the pulse signals corresponding to driving of the image sensor that are output from the pulse control circuit, and supplies a current amount that corresponds to the frequency of the received oulse signal to at least one portion of the component circuit.

* * * * *